United States Patent
Wilson et al.

(10) Patent No.: US 12,306,980 B2
(45) Date of Patent: May 20, 2025

(54) NETWORK OPERATING SYSTEM DEPLOYMENT TO REMOTE HARDWARE FOR NETWORK EXTENSIBILITY

(71) Applicant: Bank of America Corporation, Charlotte, NC (US)

(72) Inventors: Jared Wilson, Charlotte, NC (US); Jackson Byam, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 169 days.

(21) Appl. No.: 18/235,959

(22) Filed: Aug. 21, 2023

(65) Prior Publication Data

US 2025/0068753 A1    Feb. 27, 2025

(51) Int. Cl.
| | | |
|---|---|---|
| *G06F 21/62* | (2013.01) | |
| *G06F 9/4401* | (2018.01) | |
| *G06F 21/53* | (2013.01) | |
| *G06F 21/60* | (2013.01) | |
| *G06F 21/71* | (2013.01) | |
| *G06F 21/74* | (2013.01) | |

(52) U.S. Cl.
CPC ........ *G06F 21/6218* (2013.01); *G06F 9/4406* (2013.01); *G06F 21/606* (2013.01)

(58) Field of Classification Search
None
See application file for complete search history.

(56) References Cited

U.S. PATENT DOCUMENTS

| | | | |
|---|---|---|---|
| 7,844,718 B2 | 11/2010 | Polcha et al. | |
| 8,127,350 B2 | 2/2012 | Wei et al. | |
| 8,856,295 B2 | 10/2014 | Aliminati | |
| 9,356,994 B2* | 5/2016 | Quinlan | H04W 12/37 |
| 2013/0179542 A1* | 7/2013 | Wang | G06F 16/48 |
| | | | 709/219 |
| 2013/0290256 A1* | 10/2013 | Barrall | G06F 16/27 |
| | | | 707/634 |
| 2013/0290464 A1* | 10/2013 | Barrall | G06F 15/167 |
| | | | 709/213 |

(Continued)

OTHER PUBLICATIONS

Remote Control of Mobile Devices in Android Platform. Villan. (Year: 2013).*

(Continued)

*Primary Examiner* — Venkat Perungavoor
(74) *Attorney, Agent, or Firm* — Weiss & Arons LLP

(57) ABSTRACT

A system for operating a remote desktop platform at a remote client device is provided. The remote desktop platform may be launched at the remote client device. The entity network may store a secure container including files, applications and profile settings of a user. The remote client device may retrieve the secure container at each execution of the remote desktop platform. The secure container may be stored temporarily at the remote client device. The remote client device, during the operation of the remote desktop platform, may leverage the hardware and software of the remote client device for accessing and managing the files and applications stored in the secure container. The remote desktop platform may maintain synchronization with the entity network by syncing, at pre-determined intervals, the files and applications stored at the remote client device with the files and applications stored at the entity network.

20 Claims, 6 Drawing Sheets

(56) References Cited

U.S. PATENT DOCUMENTS

| | | | | |
|---|---|---|---|---|
| 2016/0212118 A1* | 7/2016 | Barrall | ............... | H04L 63/08 |
| 2017/0329963 A1* | 11/2017 | Zhai | ............... | H04W 12/02 |
| 2019/0318107 A1* | 10/2019 | Capone | ............... | G06F 21/6218 |
| 2021/0196406 A1* | 7/2021 | Mahadik | ............... | G06F 21/6218 |
| 2022/0237007 A1* | 7/2022 | Bleve | ............... | G06F 9/545 |
| 2023/0244782 A1* | 8/2023 | Fischer | ............... | G06F 11/3636 |
| | | | | 726/26 |
| 2024/0289227 A1* | 8/2024 | Ueno | ............... | G06F 11/0712 |

OTHER PUBLICATIONS

Monitoring and Controlling Access to Privacy Sensitive Resources of Android System. Jan. (Year: 2020).*

* cited by examiner

NETWORK OPERATING SYSTEM DEPLOYMENT TO REMOTE HARDWARE FOR NETWORK EXTENSIBILITY

FIELD OF TECHNOLOGY

Aspects of the disclosure relate to leveraging remote client hardware for the operation of remote desktops.

BACKGROUND OF THE DISCLOSURE

Remote clients have access to an entity network and all the applications hosted by the entity's cloud network for operating a client desktop remotely. This may be a virtual desktop operated by, and via the entity's cloud network.

The remote client device that may be hosting the virtual desktop may have available hardware and software residing at the client device that may not be accessed.

Often when a network connection is lost during a session, remote client devices may not be able to provide access to the data because the data is stored in the cloud.

Thus, the systems and methods disclosed herein may enable a remote client desktop to run, entirely on the desktop hardware, what would otherwise be run through the entity's cloud network. This may reduce the load on the cloud network, and, at the same time, provide the user with a fully functional system that can be used even if network connection is lost.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
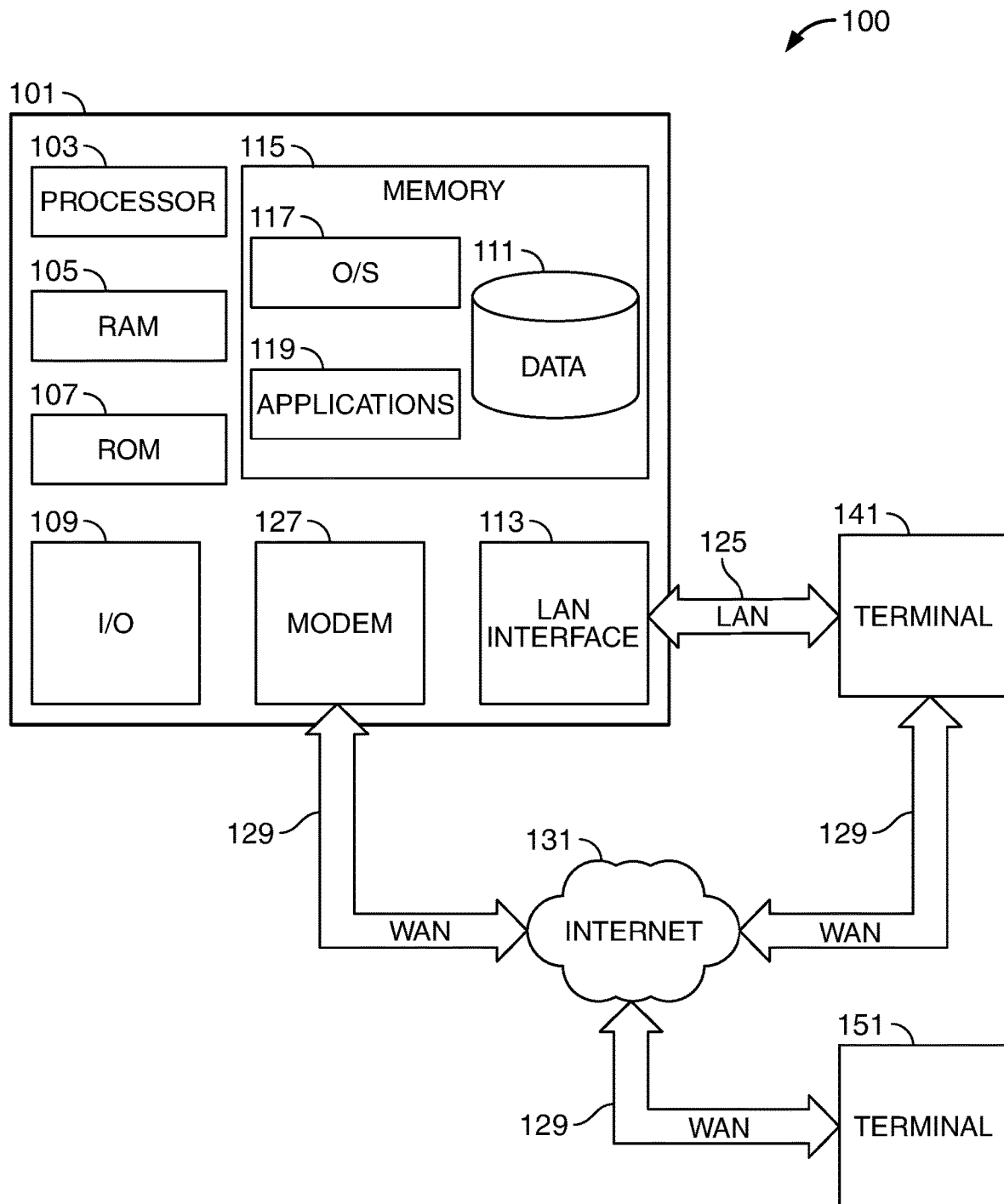
FIG. 1 shows an illustrative block diagram in accordance with principles of the disclosure.

Systems and methods for operating a remote desktop platform on a remote client device are provided. The remote client device may be in electronic communication with an entity network. The entity network may operate in a cloud environment.

The entity network may include a central server, applications associated with the entity network and a centralized data repository.

The remote client device may be any suitable computing device used by a user of the entity. The user of the entity may be an employee working remotely for the entity.

The remote client device may include both the hardware and software a computer needs to provide a fully functional computing device. The hardware and software may include but may not be limited to, a central processing unit ("CPU"), random access memory ("RAM"), a graphics processing unit ("GPU"), a solid-state drive ("SSD"), a hard disk drive ("HDD"), one or more operating systems and a display screen.

The remote desktop platform may be executed at the remote client device and operating by the hardware and software on the remote client device.

The system may include a developer application. The developer application may run on the entity network. The developer application may identify, for a user of the remote client device, user entity data. The user entity data may include files, applications and profile settings.

The files and applications may be identified based on a role of a user of the remote client device within the entity. The files and applications may also be identified based on user permissions the user has within the entity for accessing files and applications.

The developer application may be configured to generate a secure container by compiling and encrypting the files, applications and profile settings. The profile settings may include user-specific styles, setup, layout and settings within each application.

Following the generating, the developer application may be configured to store the secure container at the entity network.

Many entities have more than one branch within the entity. Each branch may manage a different part of the entity. For example, if a user of the remote desktop platform manages loans and mortgages for clients of the entity, the developer application may be configured to include those applications that operate and manage the loans and mortgages as part of the applications stored in the secure container.

Additionally, each file associated with loans and mortgages may also be stored in the secure container.

The profile settings compiled in the secure container may be continuously modified based on machine learning ("ML"). During the operating of the remote desktop platform, the production application may be monitoring the actions and changes performed on any one or more applications of the user. The actions and changes performed may be uploaded to the user's profile settings for a next session initiated at the remote desktop platform. Following each log-off of the remote desktop platform, the changes in settings, layout, and any other suitable profile features performed by the user may be saved and re-applied at a next instance of logging-in to the remote desktop platform.

The system may also include a production application. The production application may be running on the remote client device. The production application may be configured for receiving a first request from the remote client device to launch the remote desktop platform.

A launching of the remote desktop platform by the production application may include booting an operating system ("OS") at the remote client device. The remote client device may be configured for storing more than one OS. The remote client device may be configured for storing two or more OS's. The OS's may include, but may not be limited to, Microsoft Windows®, MacOS® and Linux®.

The remote client device may select an optimal OS most suitable for running the remote desktop platform. In some embodiments, the user of the remote client device may select a preferred OS from the OS's stored at the remote client device.

Following the booting, the production application may be configured to establish a secure electronic connection between the remote client device and the entity network. The electronic connection may be performed via the internet. The secure electronic connection may be a virtual private network ("VPN") for connecting to the internet.

The production application may prompt a user of the remote client device for user authorization credentials for authentication prior to accessing the remote desktop platform. The user authorization credentials may include a username and password. The user authorization credentials may include, as an additional form of authentication, a one-time password ("OTP"). The OTP may be received from the entity network via the developer application.

In response to an authentication of the user of the remote client device, the production application may be configured to retrieve the secure container from the entity network. Following the retrieval, the production application may be configured to store the secure container in a local data repository at the remote client device.

In some embodiments, upon retrieval of the secure container from the entity network, the entity network may be configured to lock each application stored at the entity network from being accessed while the remote desktop platform is running. This may prevent any changes made to one or more applications while the user may be accessing the application.

Following the final sync of the applications at the remote client device with the files and applications stored at the entity network, the entity network may be configured to unlock each file and allow access to the files.

Upon storing the secure container in the local data repository, the production application may be configured to launch, and run, the remote desktop platform.

The remote desktop platform may provide user access to the files and applications identified for the user. The files and applications may be accessed from the local data repository via the remote desktop platform. The files and applications may be accessed and displayed based on the profile settings.

The remote desktop platform may perform as a secure platform separate from other platforms running on the remote client device. The remote desktop platform may be accessed via a graphical user interface ("GUI").

The remote desktop platform may provide access to each of the files and applications stored in the secure container.

Some applications that may be accessed at the remote desktop platform may be application software that may not be fully stored at the secure container. These applications may be saved to the remote computing device a first time and may remain stored at the computing device, i.e.— Microsoft Word and Excel. However, the files that may be opened and accessed using these applications may only be accessible once the secure container is retrieved at the remote computing device.

These applications may have a private key and/or password that may be stored in the secure container. When the secure container is retrieved from the entity network and the user is authorized to access the remote desktop platform, the private key and/or password may automatically be assigned to the corresponding applications for enabling access. The files stored in the secure container may only be accessed following authorization to launch the remote desktop platform.

Some applications may be stored, in its entirety, in the secure container and may be completely deleted each time the virtual desktop platform is shut down. These applications may need to be re-installed each time the secure container is delivered to the remote computing device.

The remote desktop platform may be configured to sync, at pre-determined intervals, the files and applications stored in the secure container at the entity network with the files and applications stored on the remote desktop platform.

The entity network may be configured to update the secure container in response to the syncing.

Each file in the secure container may be stored within the entity network. The syncing may include updating each file within the entity network.

The syncing may include syncing any form of change to any one or more files and applications and any form of change to a profile setting. The syncing may also include syncing all new file(s) and/or application(s).

The pre-determined intervals may be every one minute, two minute, three minute, once in five minutes, ten minutes or any other suitable pre-determined interval.

The secure connection between the remote client device and the entity network may enable the user access to the data included in the secure container retrieved from the entity network. Additionally, all actions performed with each of the files and applications may leverage the hardware from the remote client device.

Thus, the systems and methods disclosed herein may enable a remote client desktop to run, entirely on the desktop hardware, what would otherwise be run through the entity's cloud network. This may reduce the load on the entity network, and, at the same time, provide the user with a fully functional system that can be used even if network connection is lost.

The secure container may ensure that the client network data is leveraged at the remote desktop in a secure fashion so that security requirements are not compromised. Such a system provides both the advantages of the entity's network, including the documents, programs, updates, etc., together with the stability of being accessed on a remote client device that can run independently all the entity data.

In response to receipt of a command to close the remote desktop platform, the remote desktop platform may be configured to transmit to the entity network, a final data packet including changes made to the files and applications since a most recent sync. The command may be a touch of a log-off button within the remote desktop platform.

Following the transmitting of the final data packet, the remote desktop platform may be configured to instruct the production application to delete the secure container from the local data repository at the remote client device.

The secure container may be deleted from the local data repository following each log-off of the remote desktop platform. When the user signs out of a user account within the remote desktop platform, the user may not be able to access the files and applications on the remote client device. The files and applications may be transmitted back to the repository at the entity network.

The production application may be configured for receiving a second request from the remote client device. The second request may be a request to re-launch the remote desktop platform.

The production application may perform the re-launch by establishing the secure electronic connection between the remote client device and the entity network.

In response to an authentication of the user of the remote client device, the production application may be configured to retrieve the secure container from the entity network and store the secure container locally at the remote client device.

It should be appreciated that the authentication of the user of the remote client device may be performed by the entity network.

The production application may further be configured to launch, and run, the remote desktop platform.

It should be appreciated that at an instance where the secure electronic connection is not able to be established, the production application may be configured to compile and encrypt each file and application and store the encrypted files and applications at the local data repository.

In some embodiments, when the secure electronic connection is not able to be established and the receipt of the command to close the remote desktop platform is received, the production application may be configured to compile and encrypt the final data packet. Following the compiling and encrypting, the production application may be configured to store the final data packet in a secure storage, locally, at the remote client device pending a re-establishment of the secure electronic connection.

When the re-establishment of the secure electronic connection occurs, the production application may be configured to transmit the final data packet to the entity network.

A method for operating a remote desktop platform at a remote client device is provided. The remote client device may be in electronic communication with an entity network. The method may be performed by the remote client device.

The method may include receiving a first request to launch the remote desktop platform. In response to the receiving, the method may include booting an OS at the remote client device.

The method may further include establishing a secure electronic connection between the remote client device and the entity network.

In response to an authentication of a user of the remote client device, the method may include retrieving a secure container from the entity network. The secure container may include files, applications and profile settings associated with the user.

The method may also include storing the secure container in a local data repository at the remote client device.

The method may further include executing the remote desktop platform. The executing of the remote desktop platform on the remote client device may include providing user access to the files and applications stored in the secure container. The files and applications may be operable on the remote desktop platform and via the remote desktop platform.

A user of the remote desktop platform may make changes to any one or more documents and applications. Each change may be saved at the secure container in local storage. The secure container stored at the entity network may be updated with the changes performed at the remote desktop platform.

The method may include syncing, at pre-determined intervals, the files and applications stored in the secure container at the entity network with the files and applications stored on the remote desktop platform.

The method may also include, in response to a receipt of a command to close the remote desktop platform, transmitting, to the entity network, a final data packet. The final data packet may include changes made to the files and applications since a most recent sync.

Following the transmitting of the final data packet, the method may include deleting the secure container from the local data repository at the remote client device.

The method may further include receiving a second request. The second request may be to re-launch the remote desktop platform. The second request may be followed by a third, fourth, fifth and any number of additional subsequent requests. The second request and any additional request following the second request may be for each time the user of the remote desktop platform logs into the remote desktop platform.

The re-launching may include establishing the secure electronic connection between the remote client device and the entity network.

In response to an authentication of the user of the remote client device, the method may include retrieving the secure container from the entity network and storing the secure container locally at the remote client device. Following the retrieving, the method may include launching, and running, the remote desktop platform.

The method may include prior to the receiving of the first request, identifying by a developer application running on the entity network, the files, applications and profile settings associated with the user of the remote client device. Following the identifying, the method may include generating the secure container by compiling and encrypting the files, applications and profile settings. The method may further include storing the secure container at the entity network.

The method may further include, in response to the syncing, updating the secure container at the entity network.

It should be appreciated that user access to the files and applications stored locally may only be accessible via the remote desktop platform. When the user of the remote client device has not been successfully authenticated at the remote desktop platform, the secure container stored locally may be inaccessible.

In some embodiments, when the secure electronic connection is not able to be established following receipt of a command to close the remote desktop platform, the method may include compiling and encrypting the final data packet. The method may further include storing the final data packet in a secure storage, locally, at the remote client device pending a re-establishment of the secure electronic connection.

When the re-establishment of the secure electronic connection occurs, the method may include transmitting the final data packet to the entity network.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein, such as the one or more remote client devices and the entity network. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with and/or embedded within the smart card, the POS device and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure. Applications 119 may include the developer application, the production application and any other application described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
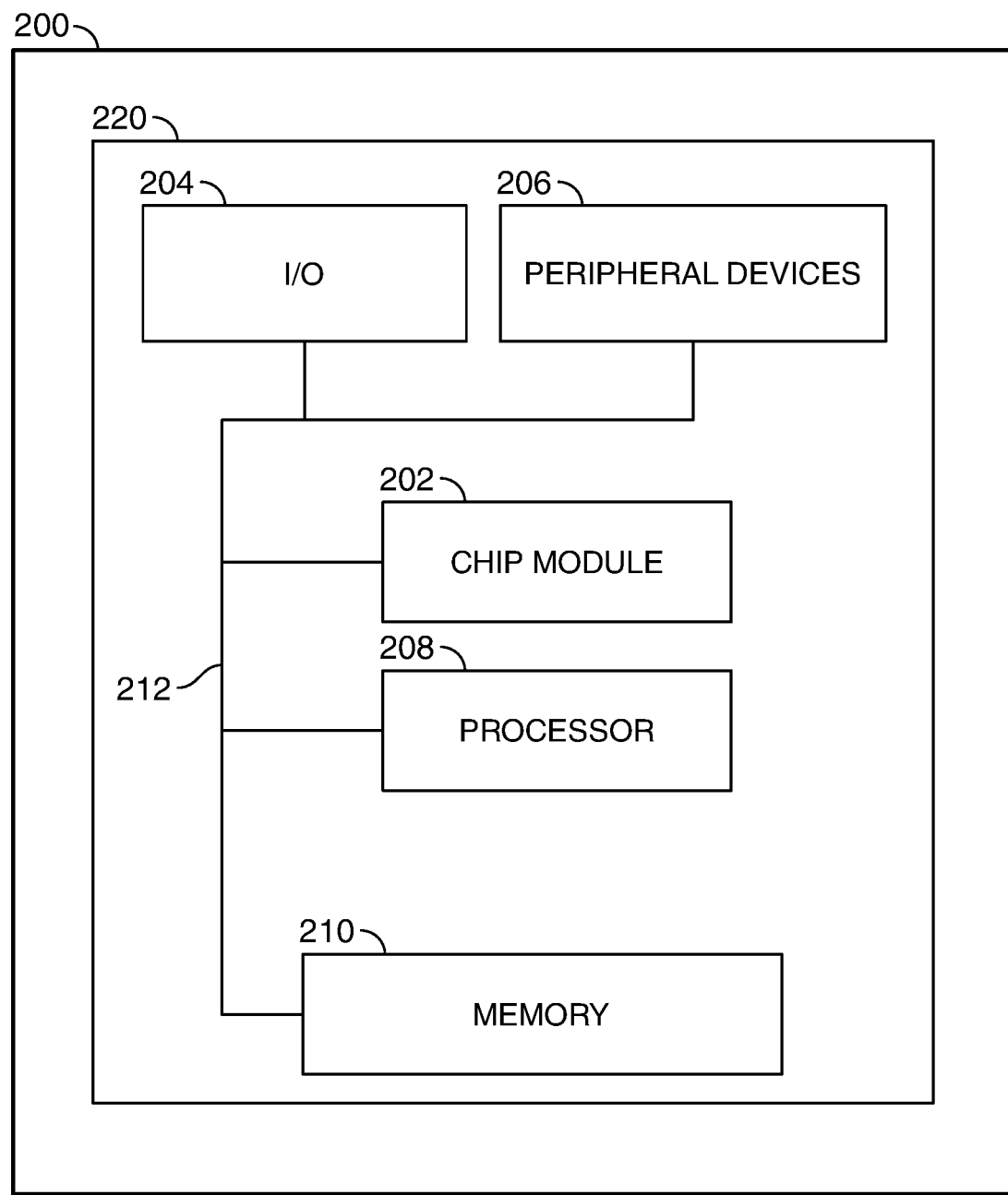
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
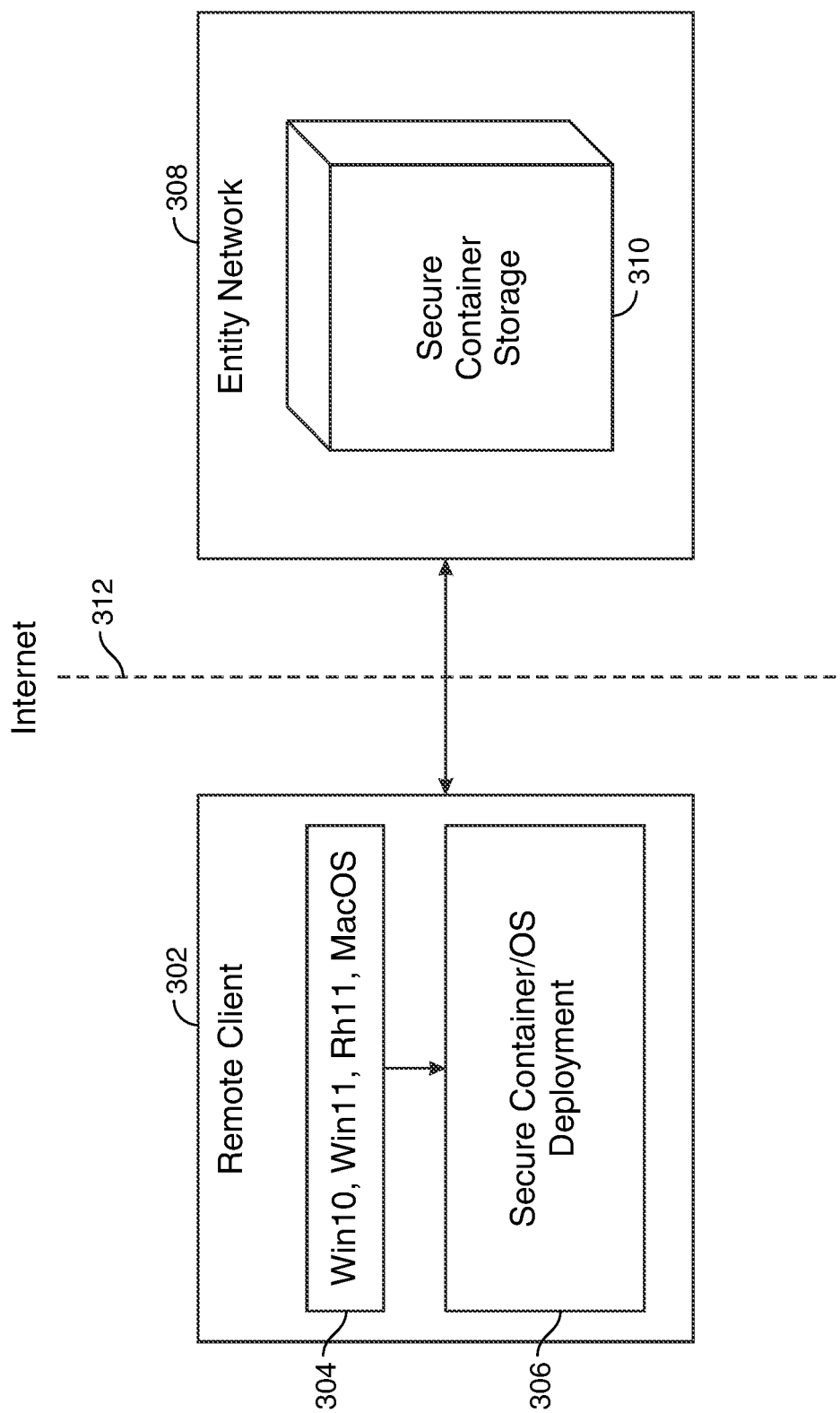
FIG. 3 shows an illustrative diagram in accordance with principles of the disclosure.

FIG. 3 shows an illustrative diagram of a remote client device 302 in electronic connection with an entity network in accordance with principles of the disclosure.

Remote client device 302 may electronically communicate with entity network 308. The electronic connection 312 may be for retrieving the secure container from storage 310 to remote client 306. The electronic connection 312 may be for transmitting the secure container and all updates to entity network 308.

The operating system may operate the execution and running of the secure container at the remote client device 302, as shown at 306.

The processing and operating of each application and file stored in the secure container may be performed by any of the operating systems 304.

Operating systems 304 may be stored and running on the remote client device 302. It should be appreciated that entity network 308 may not be providing the hardware for enabling the remote desktop platform to operate.

Remote client 302 may be hosting and running the remote desktop platform. Remote client 302 may be providing the hardware and software for executing the remote desktop platform.

Figure 4:
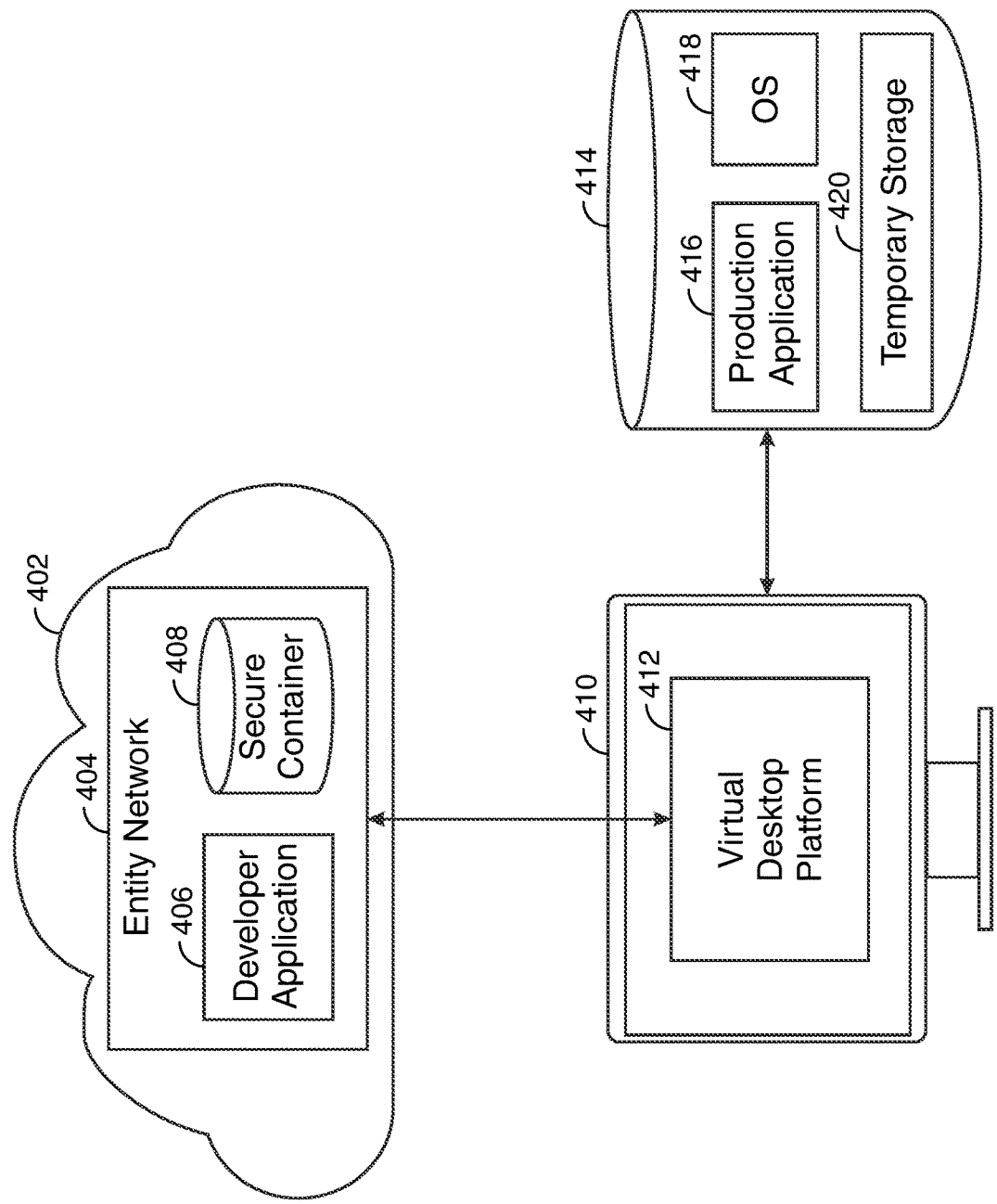
FIG. 4 shows an illustrative diagram in accordance with principles of the disclosure.

FIG. 4 shows an illustrative diagram of the system architecture in accordance with principles of the disclosure.

The system may include an entity network 404. Entity network 404 may be hosted in cloud 402. Entity network 404 may be a network associated with an entity for managing and operating the functioning of the entity.

Employees of the entity may operate remotely. The remote desktop platform 412 may enable a user to access the entity network on a remote client device 410 and leverage hardware and software stored at the remote client device for running the applications and files associated with the entity network at remote desktop platform 412.

Entity network 404 may include a developer application 406. Developer application 406 may be executed for each remote client device. Developer application 406 may be configured to generate a secure container 408 for each remote client device. Secure container 408 may include files and applications applicable to the user of the remote client device and may further include the user's personal profile settings. Secure container 408 may be stored at entity network 404. Secure container 408 may be transmitted to and from remote desktop platform 412.

Remote client device 410 may include data storage 414 for production application 416 running on the remote client device 410. One or more operating systems 418 may be stored and running on the remote client device 410. Temporary storage 420 may be for storing secure container 408 when retrieved from entity network 404. Secure container 408 may be stored in temporary storage 420 for a duration of time that remote desktop platform 412 is running at remote client device 412.

Figure 5:
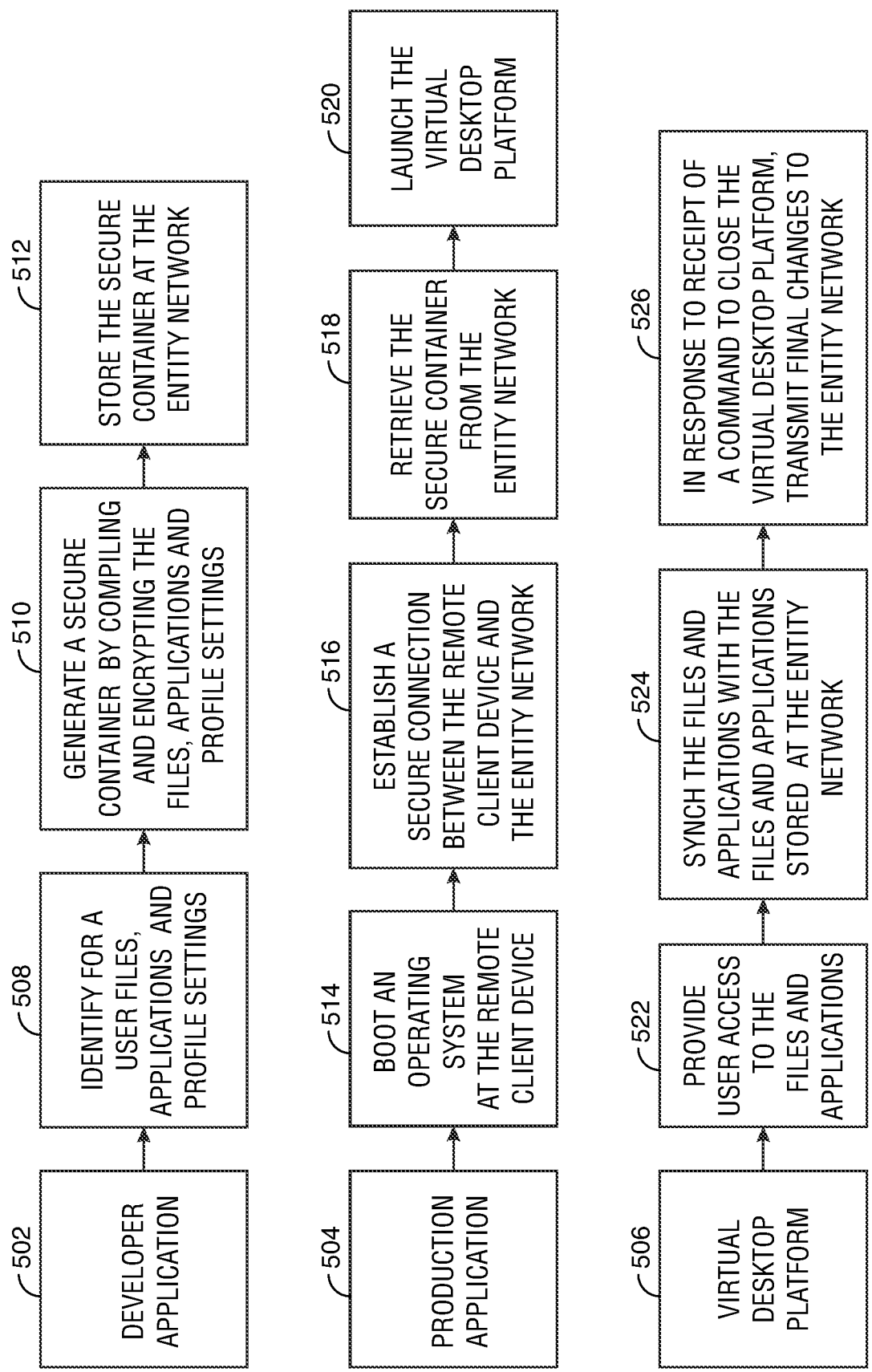
FIG. 5 shows an illustrative flow diagram in accordance with principles of the disclosure.

FIG. 5 shows an illustrative flow diagram of an operating of the remote desktop platform at a remote computing device. The operating of the remote desktop platform may include running a developer application 502 and a production application 504 in order to launch remote desktop platform 506.

Developer application 502 may be operating at the entity network. Developer application 502 may perform the steps of identifying for a user, files, applications and profile settings, as shown at 508. At step 510, developer application may be configured to generate a secure container by compiling and encrypting the files, applications and profile settings.

Production application 504 may be operating at the remote client device. Production application may be in communication with the entity network for execution of the remote desktop platform at the remote client device.

Production application 504, at a first step 514, may be configured to boot an OS at the remote client device. The OS may be selected from a plurality of OS's running at the remote client device. The production application may be configured for selecting a most optimal OS for the running of the remote desktop platform. In some embodiments, the user of the remote client device may select a preferred OS for running the remote desktop platform.

In some embodiments, the remote client device may have one OS running on the device. When only one OS is running on the remote client device, the one OS may be the one selected for booting.

At step 516, the production application 504 may be configured to establish a secure connection between the remote client device and the entity network.

At step 518, the production application may be configured to retrieve the secure container from the entity network. The secure container may be stored temporarily at local storage on the remote client device. At step 520, the production application may be configured to launch the remote desktop platform.

Remote desktop platform 506, at a first step, may be configured to provide user access to the files and applications stored within the secure container. It should be appreciated that during the duration of time the remote client device is securely authenticated as a user of the entity network, the remote desktop platform 506 may provide access to the user of the files and applications.

At step 524, remote desktop platform 506 may be configured to sync the files and applications with the files and applications stored at the entity network.

At step 526, remote desktop platform 506 may be configured to, in response to a receipt of a command to close the remote desktop platform, transmit final changes to the entity network.

Figure 6:
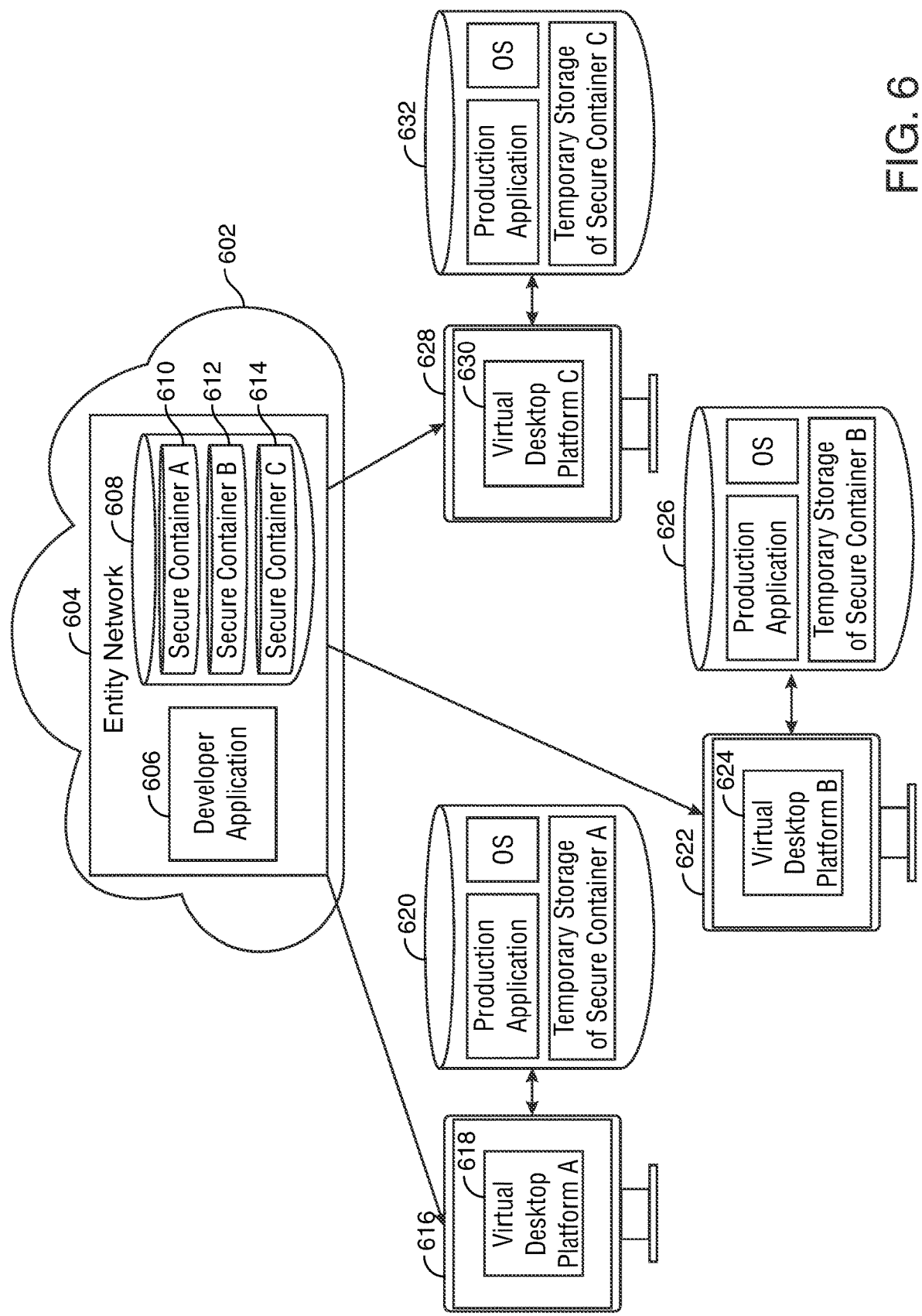
FIG. 6 shows an illustrative diagram in accordance with principles of the disclosure.

FIG. 6 shows an illustrative diagram of a system architecture of a plurality of remote client devices within an entity network.

The system architecture may include an entity network 604 running on the cloud 602. Entity network 604 may be securely connected to each remote client device 616, remote client device 622 and remote client device 628.

Entity network 604 may be a network operating a large entity. The entity may have numerous employees that may work remotely. In this embodiment, a secure container may be generated for each remote client device. Each remote client device may run a remote desktop platform at the remote client device.

Entity network 604 may operate in the cloud 604. Entity network 604 may include a developer application 606. Developer application 606 may be configured to generate a secure container for each remote client device.

Developer application 606 may generate secure container A, 610. Secure container A, 610 may include files, applications and profile settings associated with a user of remote client device 616. Secure container B, 622, may include files, applications and profile settings associated with a user of remote client device 618. Secure container C, 628, may include files, applications and profile settings associated with a user of remote client device 628.

Remote client device 616 may include a production application, one or more OS's and temporary storage for the secure container, as shown at 620. The production application at 620 may be configured to launch remote desktop platform 618 on remote client device 616.

Production application at 620 may be configured to retrieve secure container A 610 from entity network 604. Secure container A may be stored temporarily in storage at 620 of remote client device 616.

Remote client device 622 may include a production application, one or more OS's and temporary storage for the secure container, as shown at 626.

Thus, systems and methods for operating a remote desktop platform at a remote client device leveraging the hardware of the remote client device for operating is provided. Persons skilled in the art will appreciate that the present invention can be practiced by other than the described embodiments, which are presented for purposes of illustration rather than of limitation.

What is claimed is:

1. A system for operating a remote desktop platform at a remote client device, the remote client device being in electronic communication with an entity network, the system comprising:
a developer application running on the entity network and configured to:
identify, for a user of the remote client device, user entity data including files, applications and profile settings;
generate a secure container by compiling and encrypting the files, applications and profile settings; and
store the secure container at the entity network;
a production application running on the remote client device for receiving a first request from the remote client device to launch the remote desktop platform, wherein the production application performs a launching of the remote desktop platform by:
booting an operating system ("OS") at the remote client device;
establishing a secure electronic connection between the remote client device and the entity network;
in response to an authentication of the user of the remote client device, retrieving the secure container from the entity network and storing the secure container in a local data repository at the remote client device; and
launching, and running, the remote desktop platform;
the remote desktop platform configured to:
provide user access to the files and applications, the files and applications operating, on the remote desktop platform, using the profile settings;
sync, at pre-determined intervals, the files and applications stored in the secure container at the entity network with the files and applications stored on the remote desktop platform; and
in response to receipt of a command to close the remote desktop platform:
transmit, to the entity network, a final data packet including changes made to the files and applications since a most recent sync; and
instruct the production application to delete the secure container from the local data repository at the remote client device; and
the production application for receiving a second request from the remote client device to re-launch the remote desktop platform, wherein the production application performs the re-launch by:
establishing the secure electronic connection between the remote client device and the entity network;
in response to an authentication of the user of the remote client device, retrieving the secure container from the entity network and storing the secure container locally at the remote client device; and
launching, and running, the remote desktop platform.

2. The system of claim 1 wherein the entity network is configured to store the secure container and update the secure container in response to the syncing.

3. The system of claim 1 wherein the identifying of the user entity data is based on a role of the user within an entity associated with the entity network and permissions granted to the user.

4. The system of claim 1 wherein the profile settings comprise a format, a layout and a display of each application within the remote desktop platform.

5. The system of claim 1 wherein the secure electronic connection is via a virtual private network ("VPN").

6. The system of claim 1 wherein the authentication of the remote client device is performed by the entity network.

7. The system of claim 1 wherein the OS is selected from two or more OS's available at the remote client device.

8. The system of claim 7 wherein the two or more OS's comprise Microsoft Windows®, MacOS®, Rh11® and Linux®.

9. The system of claim 1 wherein access to a retrieval of any files and applications stored in the secure container, when stored locally, is only accessible via the remote desktop platform.

10. The system of claim 1 wherein, when the secure electronic connection is not able to be established and the command to close the remote desktop platform is received, the production application is configured to:
compile and encrypt the final data packet; and
store the final data packet in a secure storage, locally, at the remote client device pending a re-establishment of the secure electronic connection.

11. The system of claim 10 wherein, when the re-establishment of the secure electronic connection occurs, the production application is configured to transmit the final data packet to the entity network.

12. The system of claim 1, wherein, in response to the retrieving of the secure container from the entity network, the entity network is configured to lock each file stored in the secure container on the entity network from being accessed.

13. The system of claim 12 wherein following the transmitting of the final data packet to the entity network, the entity network is configured to unlock each file stored in the secure container and enable access to each file.

14. A method for operating a remote desktop platform at a remote client device, the remote client device being in electronic communication with an entity network, the method being performed by the remote client device, the method comprising:
receiving a first request to launch the remote desktop platform;
in response to the receiving, booting an operating system ("OS") at the remote client device;
establishing a secure electronic connection between the remote client device and the entity network;
in response to an authentication of a user of the remote client device, retrieving a secure container from the entity network, the secure container comprising files, applications and profile associated with the user;
storing the secure container in a local data repository at the remote client device;
launching, and running, the remote desktop platform by:
providing user access to the files and applications, the files and applications operating, on the remote desktop platform;
syncing, at pre-determined intervals, the files and applications stored in the secure container at the entity network with the files and applications stored on the remote desktop platform; and
in response to receipt of a command to close the remote desktop platform:
transmitting, to the entity network, a final data packet including changes made to the files and applications since a most recent sync; and
deleting the secure container from the local data repository at the remote client device; and
receiving a second request to re-launch the remote desktop platform, the re-launching comprising:
establishing the secure electronic connection between the remote client device and the entity network;
in response to an authentication of the user of the remote client device, retrieving, the secure container from the entity network and store the secure container locally at the remote client device; and
launching, and running, the remote desktop platform.

15. The method of claim 14, wherein prior to the receiving of the first request, the method comprises:
identifying, by a developer application running on the entity network, the files, applications and profile settings associated with the user of the remote client device;
generating the secure container by compiling and encrypting the files, applications and profile settings; and
storing the secure container at the entity network.

16. The method of claim 14 further comprising, in response to the syncing, updating the secure container at the entity network.

17. The method of claim 14 following wherein user access to the files and applications stored locally are only accessible via the remote desktop platform.

18. The method of claim 14 wherein, when the secure electronic connection is not able to be established and the command to close the remote desktop platform is received, the method comprises:
compiling and encrypting the final data packet; and
storing the final data packet in a secure storage, locally, at the remote client device pending a re-establishment of the secure electronic connection.

19. A remote desktop platform residing at a remote client device, the remote client device being in electronic communication with an entity network, the remote desktop platform comprising:
a developer application running on the entity network, the developer application configured for selecting applications and files for user access via the remote desktop platform, the developer application configured to:
identify, for a user of the remote client device, user entity data including files, applications and profile settings;
generate a secure container by compiling and encrypting the files, applications and profile settings; and
store the secure container at the entity network;
a production application running on the remote client device, the production application configured for launching the remote desktop platform, the production application configured to:
receive a first request from the remote client device to launch the remote desktop platform;
boot an operating system ("OS") at the remote client device;
establish a secure electronic connection between the remote client device and the entity network;

in response to an authentication of the user of the remote client device, retrieve the secure container from the entity network;

store the secure container in a local data repository at the remote client device; and launch, and run, the remote desktop platform; and wherein, upon the launch of the remote desktop platform:

providing user access to the files and applications, the files and applications operating, on the remote desktop platform, using the profile settings;

syncing, at pre-determined intervals, the files and applications stored in the secure container at the entity network with the files and applications stored on the remote desktop platform; and in response to receipt of a command to close the remote desktop platform:

transmitting, to the entity network, a final data packet including changes made to the files and applications since a most recent sync; and instructing the production application to delete the secure container from the local data repository at the remote client device.

20. The remote desktop platform of claim 19 wherein upon receipt of a second request from the remote client device to re-launch the remote desktop platform, the production application performs the re-launch by:

establishing the secure electronic connection between the remote client device and the entity network;

in response to an authentication of the user of the remote client device, retrieving the secure container from the entity network and storing the secure container locally at the remote client device; and launching, and running, the remote desktop platform.

* * * * *